Figure 1:
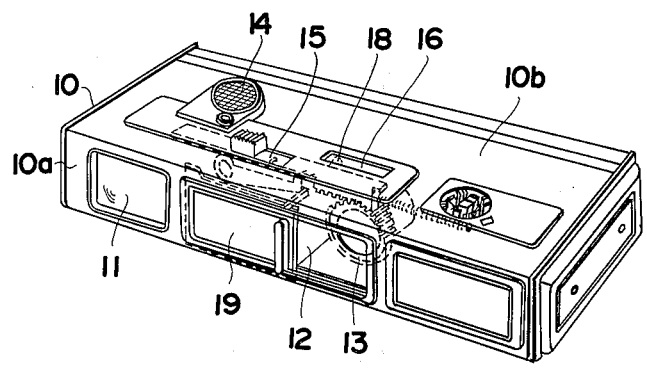

United States Patent [19]

Yamashita

[11] 3,913,113

[45] Oct. 14, 1975

[54] COMPACT CAMERA WITH OBJECTIVE LENS SETTABLE TO PRE-SELECTED FOCUS

[75] Inventor: Maki Yamashita, Osaka, Japan

[73] Assignee: Minolta Camera Kabushiki Kaisha, Osaka, Japan

[22] Filed: Nov. 2, 1973

[21] Appl. No.: 412,243

[30] Foreign Application Priority Data
Nov. 22, 1972 Japan.................... 47-134968[U]

[52] U.S. Cl.............................. 354/195; 354/354
[51] Int. Cl. ........................................... G03b 3/02
[58] Field of Search .......... 354/187, 195, 253, 266, 354/268, 288, 289, 354

[56] References Cited
UNITED STATES PATENTS
3,798,670  3/1974  Lonaka........................ 354/354 X
3,810,227  5/1974  Lonaka........................... 354/253

Primary Examiner—Samuel S. Matthews
Assistant Examiner—E. M. O'Connor
Attorney, Agent, or Firm—Wenderoth, Lind & Ponack

[57] ABSTRACT

A compact photographic camera having an objective lens adjustable selectively to a pair of focusing positions, wherein the objective lens is automatically returned to a definite one of the two focusing positions in response to closure of a lens protective covering used to protect the objective lens. To this end, a focus reset mechanism employing a slider and a linkage is utilized. The slider acts to axially and rotatably move the lens barrel carrying therein the objective lens between the two focusing positions through the intervention of the linkage operatively disposed between the slider and the lens protective covering. The linkage does not operate when the lens protective covering is in a closed position, thereby providing focus adjustment to be effected as desired during opening of the lens protective covering.

12 Claims, 3 Drawing Figures

COMPACT CAMERA WITH OBJECTIVE LENS SETTABLE TO PRE-SELECTED FOCUS

The present invention relates to a compact photographic camera of a type having an objective lens assembly of short focal length relative to the size of the objective lens assembly and that of a single frame of photosensitive film used, which is possibly referred to as a "fool-proof camera" or "pocket camera". More particularly, the present invention pertains to such a foolproof camera wherein the objective lens assembly can be adjustable selectively between at least two focusing positions, for example, for portrait photography and snapshot, respectively, and wherein means is provided for permitting the objective lens assembly, that has been set at either of these focusing positions, to automatically assume the other focusing position in response to closure of a lens protective covering moving across and frontwardly of the objective lens assembly. For convenience of description, means for permitting the objective lens assembly, set at one focusing position, to automatically assume another focusing position after exposure has been made is hereinafter referred to as a focus reset mechanism.

A camera employing this type of focus reset mechanism is known and an example of which is disclosed in the U.S. Pat. No. 3,138,082, patented on June 23, 1964. According to this U.S. patent, a camera, quitely different in type from that to which the present invention is applied, includes a camera body having instrumentalities, such as film advance lever and shutter release mechanism, which are operated sequential to the actual making of an exposure, and an objective lens barrel rigidly or interchangeably secured to the front of the camera body. Exposure adjusting components, for example, a distance or range adjusting ring, is also provided on the objective lens barrel for rotation about the longitudinal axis of said lens barrel. The focus reset mechanism disclosed and employed in this camera according to the above numbered U.S. patent comprises a reset ring obviously rotatable together with the range adjusting ring about the longitudinal axis of the lens barrel and having a plurality of detent notches spacedly formed along the periphery of said reset ring in coordination with the positions of the distance indicia on the range adjusting ring which are associated with portrait and/or close-up photography. A spring element, for example, a tension spring, which forms a part of the focus reset mechanism, biases the reset ring in one direction to a position in which the range adjusting ring reads a particular one of the distance indicia which corresponds to a depth of focus range from "infinity" to a predeterminend distance covered within such depth of focus range. The focus reset mechanism further comprises a linkage having one end selectively engageable in said detent notches for holding the reset ring, i.e., the range adjusting ring in a preselected position after said range adjusting ring has been rotated against the spring element, and the other end operatively associated with one of the instrumentalities, operable sequential to the actual making of an exposure, for disengaging the first mentioned end of said linkage from the particular one of the detent notches in response to operation of said one of the instrumentalities so that the reset ring returns to such original position as biased by the spring element.

So far as the focus reset mechanism is concerned, due to the type of camera to which it has been applied according to the above numbered U.S. patent, a certain disadvantage is left still unsolved. In other words, in case several pictures are to be successively photographed of a subject or subjects situated a relatively short distance away from the camera while the photographer obviously aims at taking portraits of the subject or subjects, distance adjustment must be carried out either with the aid of a range finder or by estimation with reference to the distance scale, each time these pictures have been taken. This is because operation of one of the instrumentalities, for example, either the film advance lever or the shutter release mechanism, which is inevitably operated sequential to the actual making of each exposure, results in the range adjusting ring instantaneously returning to the definite position by the action of the spring element through the reset ring.

Accordingly, an essential object of the present invention is to provide a compact camera having an improved focus reset mechanism by which the above mentioned disadvantage can be eliminated.

Another important object of the present invention is to provide a compact camera of the type referred to above wherein the focus reset mechanism operates in response to closure of a lens protective covering which is effected only when the photographer desires to do so.

A further object of the present invention is to provide a compact camera of the type referred to above wherein the focus reset mechanism comprises a minimum number of parts and which is, therefore, inexpensive and reliable in performance.

According to the present invention, the compact camera is disclosed as having a focus reset mechanism which, although it can be operated whenever desired irrespective of the position of the camera lens protective covering, can automatically operate in response to closure of the lens protective covering thereby permitting the objective lens to be conditioned to either the portrait position or the snapshot position. This focus reset mechanism basically comprises a slider having one end formed with a rack gear in constant mesh with a pinion gear mounted, or integrally formed, on the objective lens barrel for effecting an axial and rotary movement of said barrel for focus adjustment in response to a sliding motion of said slider. The slider is not only manually movable for manual focus adjustment, but also automatically moved in response to closure of the lens protective covering. For this purpose, a linkage is provided between the lens protective covering and the slider.

Figure 2:
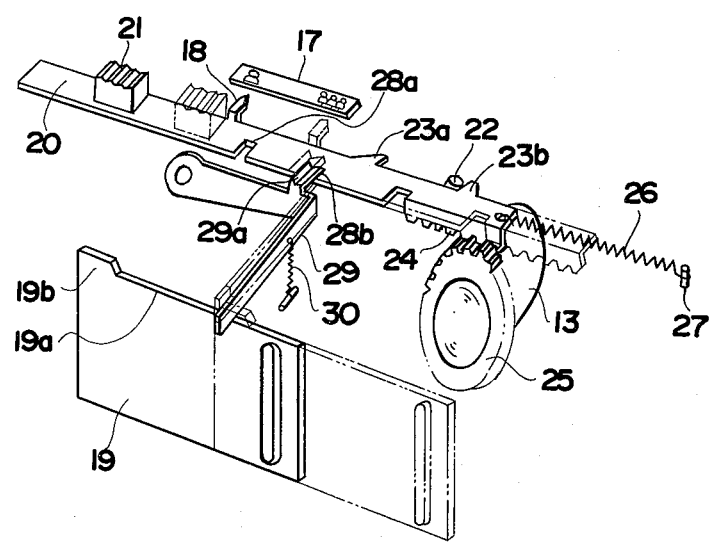
Figure 3:
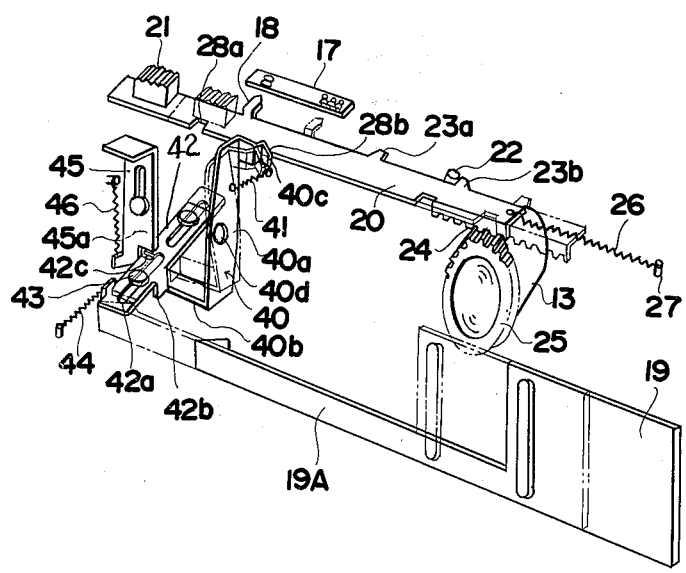

These and other objects and features of the present invention will become apparent from the following description taken in conjunction with preferred embodiments thereof with reference to the accompanying drawings, in which;

FIG. 1 is a perspective view of a compact camera embodying the present invention, which shows a focus reset mechanism in relation to the outer appearance of the compact camera, FIG. 2 is a perspective view, on an enlarged scale, of the focus sheet mechanism employed in the camera of FIG. 1, and FIG. 3 is a similar view to FIG. 2, but showing a modified focus reset mechanism.

Before the description of the present invention proceeds, it should be noted that like parts are designated by like reference numerals throughout the accompanying drawings.

Referring to FIGS. 1 and 2, the compact camera to which the present invention is applicable comprises a housing 10 of substantially box-like shape including a front panel portion 10a formed with a viewfinder front window 11, either glazed or non-glazed, and a light entrance 12. The housing 10 has an objective lens barrel 13 supported therein in alignment with the light entrance 12 for axial and rotary motion for focus adjustment with respect to the plane of each frame of film (not shown) which extends behind said lens barrel 13 at right angles to the optical axis of the objective lens carried by said lens barrel 13. The housing 10 further includes an upper panel portion 10b non-detachably mounted with a shutter release button 14 in any known manner and formed therein with a rectangular opening 15 and a display window 16.

The display window 16 has an index table, as best shown by 17 in FIG. 2 or 3, which bears thereon a pair of spaced first and second indicia or markings indicative of respective focusing positions of the lens in the lens barrel 13. By way of example, the first indicium on the index table 17 is a symbolic representation of the upper half of a single person and the focusing position represented by this indicium is hereinafter referred to as a portrait position because of the fact that, when a pointer 18 is registered with this first indicium in a manner as will become clear later, the objective lens is conditioned in the portrait position such as to permit the zone of sharpness, i.e., the depth of field, to cover a subject or subjects located a relatively small distance away from the camera. On the other hand, the second indicium is a symbolic representation of a group of persons and the focusing position represented by this second indicium is hereinafter referred to as a snapshot position because of the fact that, when the pointer 18 is registered with this second indicium, the objective lens is conditioned in the snapshot position such as to permit the zone of sharpness to cover a subject or subjects located within a substantial range from the far limit of the region of sharp focus, that is appreciable when the pointer 18 would be registered with the first indicium, to infinity.

A lens protective lid 19 is mounted to the front panel portion 10a of the housing 10 and manually slidable in opposite directions at right angles to the optical axis of the objective lens for selectively closing and opening the light entrance 13.

As best shown in FIG. 2, the focus reset mechanism includes a slider 20 slidable beneath the interior surface of the upper panel portion 10b of the housing 10 and has one end portion rigidly mounted with an operating piece 21 which slightly outwardly extends through the rectangular opening 15 and is manually movable within said opening 15 for a distance corresponding to the space between the first and second indicia on the index table 17. It should be noted that, although not shown, the slider 20 is slidably supported in position within the housing 10 for movement in parallel to the plane of the upper panel portion 10b in spaced relation to or in contact with the interior surface of said upper panel portion 10b.

The slider 20 is integrally formed, or otherwise rigidly provided, with an angled projection, intermediate thereof, which forms the aforementioned pointer 18. Sliding movement of the slider 20 may, if the length of the rectangular opening 15 is larger than required, be defined by a pin member 22, secured to the interior surface of the upper panel portion 10b, which cooperates with a pair of spaced projections 23a and 23b integrally formed with the slider 20.

The other end portion of the slider 20 is integrally formed with, or otherwise rigidly mounted with, a rack gear 24 which extends for a distance slightly greater than the stroke of movement of the slider 20 and which is constantly meshed or engaged with a pinion gear 25 on the lens barrel 13. The pinion gear 25 may be integrally formed with the lens barrel 13, or otherwise may be employed in the form of a geared ring rigidly mounted on the lens barrel.

The slider 20 is biased in one direction by a tension spring 26, suspended between said slider 20 and a stay 27 secured, for example, to the interior surface of the upper panel portion 10b, so that the pointer 18 is normally registered with the second indicium on the index table 17. Therefore, the objective lens in the lens barrel 13, then correspondingly biased about the optical axis thereof by the tension spring 26 through the rack-and-pinion mechanism, is conditioned in the snapshot position. This design is based on the fact that taking a portrait photograph is less frequent than taking a snapshot photograph.

The slider 20 is also formed with a pair of detent notches 28a and 28b spaced from each other at a distance corresponding to the space between the first and second indicia on the index table 7, the function of which will become clear from the subsequent description.

The focus reset mechanism further includes a substantilly L-shaped link 29 having one end pivotally supported by a solid body within the housing 10 and the other end extending above the lens protective lid 19. Adjacent the bend of the L-shaped link 29, an engagement 29a is integrally formed in the link 29 for selective engagement in said detent notches 28a and 28b in response to the positioning of the slider 20. However, by the action of a tension spring as indicated by 30, the link 29 is pivoted in one direction whereby the free end of said link 29 is in sliding engagement with an upper edge 19a of the lens protective lid 19 when the latter is opened and the engagement 29a is engaged in the detent notch 28b when the slider 20 is held in position with the pointer 18 in alignment with the second indicium on the index table 17 or in the detent notch 28a when the slider 20 is, as shown in FIG. 2, moved against the tension spring 26 with the pointer 18 in alignment with the first indicium on the index table 17. For this purpose, it should be noted that the pulling force exerted by the tension spring 30 is greater than that exerted by the tension spring 26 when the latter is operationally expanded.

The upper edge 19b of the lens protective lid 19 has one end formed with a cam projection 19a for pivoting the link 29 against the tension spring 30 as the lens protective lid 19 is closed with the free end of the link 29 sliding over said cam projection 19b.

In operation, assuming that the various parts of the focus reset mechanism are positioned such as shown by the real line in FIG. 2 with the lens protective lid 19 opened to permit a beam of light to enter the lens barrel 13 through the light entrance 12 of the housing 10, the objective lens in the lens barrel 13 is held in the portrait position while the pointer 18 is in alignment with the first indicium on the table 17. Shift of the pointer 18 from the first indicium to the second indicium for conditioning the objective lens in the lens barrel 13 in the snapshot position as shown by the chain line can be, if the lens protective lid 19 is not closed, effected by the application of an external pushing force to the operating piece 21 in which case the engagement 29a that has been engaged in the detent notch 28b escapes from said notch 28b, sliding on the slider 20 and finally engaging into the notch 28a. During the movement of the slider 20 thus effected, the linear motion of the slider 20 is translated by the rack-and-pinion mechanism into a rotary motion undertaken by the lens barrel 13, thus permitting the latter to attain the snapshot position.

Alternately, the shift of the pointer 18 to the second indicium on the table 17 can be automatically effected in response to closure of the lid 19 as shown by the chain line. More specifically, as the lid 19 is moved to the closed position, the cam projection 19b causes the link 29 to pivot against the tension spring 30 with the engagement 29a escaping from the detent notch 28b, at which time the slider 20 is permitted to instantaneously move as pulled by the tension spring 26. At the time of complete closure of the light entrance 12 with the lid 19 positioned as indicated by the chain line, the engagement 29a in the link 29 is held in position immediately above the detent notch 28a and subsequent opening of the lid 19 with the free end of the link 29 resting on the upper edge 19a causes the engagement 29a to engage in the notch 28a as pulled by the tension spring 30. As a matter of course, closure of the light entrance 12 with the lens protective lid 19 is effected only when the camera is temporarily out of use and, therefore, whenever the lens protective lid 19 is opened, the objective lens in the lens barrel 13 is always held in the snapshot position.

In case where the objective lens is desired to be held in the portrait position whenever the lens protective lid 19 is opened, this can be achieved by changing the position of the tension spring 26 and, hence, the biasing direction of said tension spring 26.

In the embodiment shown in FIG. 3, modification has been made to associate the shutter release button 14 with the focus reset mechanism in such a manner that, when the lens protective lid 19 is in the closed position, the shutter release button 14 is locked to avoid a faulty taking of a photographic picture while the light entrance 12 is closed.

To this end, a linkage between the slider 20 and the lens protective lid 19 comprises a substantially L-shaped link 40 having a first portion 40a extending downwardly of the slider 20 and a second portion 40b extending in parallel to the slider 20. This L-shaped link 40 is pivotally supported by a pin member (not shown) which is tapped into the solid body (not shown) within the housing 10 through a bearing opening 40d formed intermediate of the first portion 40a thereof.

An engagement 40c, which corresponds in function to the engagement 29a employed in the foregoing embodiment, is integrally formed on a free end of the first portion 40a of the link 40 and the link 40 is biased about the bearing opening 40d by a tension spring 41 with the engagement 40c urged towards the slider 20 as shown by the real line.

An actuating link 42 having a pair of slots 42a and a bent portion 42b, both formed therein, is supported in position within the housing 10 by means of set pins 43 which define the stroke of sliding movement of the actuating link 42 in cooperation with the respective slots 42a. This actuating link 42 extends over and at right angles to the second portion 40b of the link 40 for movement between operative and inoperative positions and is normally biased to the operative position by a tension spring 44. This can be moved to the inoperative position against the tension spring 44 in response to closure of the lens protective lid 19. For this purpose, the lens protective lid 19 in this embodiment is shown as having an arrow-headed projection 19A which extends in a direction parallel to the direction of movement of the lid 19 and which, as the lid 19 is moved to the closed position as indicated by the chain line, engages the actuating link 42 so as to cause the latter to move to the inoperative position as indicated by the chain line.

While in the above construction, the link 42 is operatively associated with the L-shaped link 41 through the bent portion 42b in such a way that, as the link 42 is moved towards the inoperative position, the portion 42b abuts against the second portion 40b of the link 40, thus causing the latter to pivot against the tension spring 41 with the engagement 40c disengaging from the detent notch 28b in a manner as indicated by the chain line. Disengagement of the engagement 40c from the detent notch 28b in the slider 20 permits the slider 20 to instantaneously move as pulled by the tension spring 26 in the same way as in the foregoing embodiment.

The actuating link 42 is also formed with a notch 42c substantially opposed to the bent portion 42b and having a width slightly greater than the thickness of a shutter release lever 45.

The shutter release lever 45 is supported in any known manner within the housing 10 and has one end in contact with the shutter release button 14, a portion of said lever 45 within the housing 10 being operatively associated with a shutter release mechanism (not shown) in any known manner. This shutter release lever 45 is normally upwardly biased by a spring element, for example, a tension spring 46 with the release button 15 outwardly projected, and has a step formed therein as at 45a. The step 45a of the lever 45 rests on the actuating link 42 in contact therewith when the latter is in the inoperative position, thereby locking the shutter release button 14 without operating the shutter release mechanism. However, when the actuating link 42 is in the operative position as indicated by the real line, depression of the release button 14 accompanies a corresponding movement of the lever 45 with the step 45a passing through the notch 42c in the link 42, thereby operating the shutter release mechanism.

So far as the focus reset mechanism is concerned, both of the embodiments of FIGS. 2 and 3 efficiently operate in a similar manner with no substantial reduction of performance. However, in the embodiment of FIG. 3, faulty operation of the shutter release mechanism during closure of the light entrance 12 can be effectively avoided only by utilizing a portion of the focus reset mechanism.

Although the present invention has been fully described by way of example with reference to the accompanying drawings many variations are possible within the spirit of the subject invention. By way of example, it is possible to utilize a latch mechanism or the like mechanism for operating the slider in response to clusure of the lens protective lid. Accordingly, such changes and modifications are, unless otherwise they depart from the true scope of the present invention, to be construed as included within the scope of the present invention.

What is claimed is:

1. A photographic camera having a housing structure formed with a light entrance in front of an objective lens barrel and a lens protective covering movably supported in position by the housing structure for selectively closing and opening the light entrance, said objective lens barrel being selectively shiftable between at least first and second focusing positions for focus adjustment, comprising in combination;
    a slider having detent elements formed therein, the number of said detent elements corresponding to the number of said focusing positions, and spaced from each other at a distance along said slider corresponding to the space between said focusing positions along said lens barrel;
    means for transmitting a movement of said slider to said lens barrel for shifting the latter selectively between said first and second focusing positions in response to said movement of said slider;
    means for biasing said lens barrel in one direction to said first focusing position; and
    linkage means having an engagement formed therein for selective engagement with said detent elements, said engagement being engaged with one of said detent elements when said lens barrel is in the first focusing position and with the other detent element, when said lens barrel is in the second focusing position against said biasing means, thereby to hold said lens barrel in said second focusing position, said linkage means being operatively associated with the lens protective covering so as to permit said lens barrel to assume said first focusing position whenever said lens protective covering is closed.

2. A photographic camera as claimed in claim 1, wherein said biasing means comprises a tension spring having one end connected to said slider and the other end fixed in position within said housing structure, a pulling force of said tension spring being transmitted to said lens barrel through said transmitting means thereby to hold said lens barrel in said first focusing position.

3. A photographic camera as claimed in claim 2, wherein said transmitting means comprises a rack gear formed in said slider and a pinion gear formed on said lens barrel, said rack gear and said pinion gear being in constant mesh with each other.

4. A photographic camera as claimed in claim 1, wherein said transmitting means comprises a rack gear formed in said slider and a pinion gear formed on said lens barrel, said rack gear and said pinion gear being in constant mesh with each other.

5. A photographic camera as claimed in claim 2, wherein said slider is manually movable for selectively shifting said lens barrel between said focusing positions as desired.

6. A photographic camera as claimed in claim 1, wherein said linkage means comprises a substantially L-shaped link having one end pivotally secured in position within the housing structure, said engagement being formed in said link adjacent to the bend of the L thereof, and the other free end thereof engageable with the lens protective covering, and further comprising additional means for biasing said link in one direction so that said engagement can be engaged with either one of said detent elements when said slider is shifted, said link pivoting against said additional biasing means due to the engagement between said other end of said link and said lens protective covering upon closure of said lens protective covering for, releasing said engagment from one of said detent elements and allowing said slider to move to a position wherein another of said detent elements receives therein said engagement.

7. A photographic camera as claimed in claim 1, wherein said linkage means comprises a substantially L-shaped link pivotally supported in position within the housing structure and having one end portion formed with said engagement, additional means for biasing said link in one direction so that said engagement of said detent elements, a shutter release lever operatively associated with a shutter release mechanism, an actuating lever slideably supported in position within the housing structure for movement between operative and inoperative positions, and a third biasing means for biasing said actuating lever having one end engageable with the lens protecting covering, as the latter is closed, for causing said actuating lever to move towards the inoperative position against said third biasing means, said actuating lever in said inoperative position locking said shutter release lever in position without operating the shutter release mechanism, said actuating lever also abutting against the other end portion of said L-shaped link whereby said L-shaped link is pivoted against said additional biasing means for releasing said engagment from one of said detent elements and allowing said slider to move to a position wherein another of said detent elements receives therein said engagement.

8. A photographic camera having a housing structure formed with a light entrance in front of an objective lens barrel and a lens protective covering movably supported in position by the housing structure for selectively closing and opening the light entrance, said objective lens barrel being selectively shiftable between at least first and second focusing positions for focus adjustment, comprising in combination:
    a slider having detent notches formed therein, the number of said detent notches corresponding to the number of said focusing positions, and spaced from each other at a distance along said slider corresponding to the space between said focusing positions along said lens barrel;
    means for transmitting a movement of said slider to said lens barrel for shifting the latter selectively between said first and second focusing positions in response to said movement of said slider;
    a first tension spring for biasing said slider in one direction to urge said lens barrel to the first focusing position, said slider being capable of manually moving in the opposite directions for selectively shifting said lens barrel between said focusing positions as desired;
    a substantially L-shaped link having one end pivotally supported in position within the housing structure and the other free end thereof engageable with the lens protective covering, said L-shaped link further having an engagement formed therein adjacent to the bend of the L thereof; and
    a second tension spring for biasing said L-shaped link in one direction so that said engagement can be engaged with one of the detent notches when said slider is shifted, said link being pivotable against said second tension spring by the engagement between said other end of said link and said lens protective covering upon closure of the latter for, releasing said engagment from one of said detent elements and allowing said slider to move to a position wherein another of said detent elements receives therein said engagement thereby permitting the lens barrel to assume the first focusing position whenever said lens protective covering is opened.

9. A photographic camera as claimed in claim 8, wherein said transmitting means comprises a rack gear formed in said slider and a pinion gear formed on said lens barrel, said rack gear and said pinion gear being in constant mesh with each other.

10. A photographic camera having a housing structure formed with a light entrance in front of an objective lens barrel and a lens protective covering movably supported in position by the housing structure for selectively closing and opening the light entrance, said objective lens barrel being selectively shiftable between at least first and second focusing positions for focus adjustment, comprising in combination:

a slider having detent notches formed therein, the number of said detent notches corresponding to the number of said focusing positions, and spaced from each other at a distance along said slider corresponding to the space between said focusing positions along said lens barrel;

means for transmitting a movement of said slider to said lens barrel for shifting the latter selectively between said first and second focusing positions in response to said movement of said slider;

a first tension spring for biasing said slider in one direction to urge said lens barrel to the first focusing position, said slider being capable of manually moving in opposite directions for selectively shifting said lens barrel between said focusing positions as desired;

a substantially L-shaped link pivotally supported in position within the housing structure and having one end portion formed with an engagement selectively engageable to said detent notches;

a second tension spring for biasing said link in one direction so that said engagement can be engaged with one of said detent notches when said slider is shifted;

a shutter release lever operatively associated with a shutter release mechanism;

an actuating lever slideably supported in position within the housing structure for movement between operative and inoperative positions; and a third tension spring for biasing said actuating lever in one direction to the operative position, said actuating lever having one end engageable with the lens protective covering, as the latter is closed, for causing said actuating lever to move towards the inoperative position against said third biasing means, said actuating lever in said operative position locking said shutter release lever in position without operating the shutter release mechanism while abutting against the other end portion of said link, whereby said link is pivoted against said second tension spring for releasing said engagment from one of said detent elements and allowing slider to move to a position wherein another of said detent elements receives therein said engagement, thereby permitting the lens barrel to assume the first focusing position whenever said lens protective covering is opened, said actuating lever in said operative position permitting the shutter release lever to operate the shutter release mechanism upon depression thereof.

11. A photographic camera as claimed in claim 10, wherein said transmitting means comprises a rack gear formed in said slider and a pinion gear formed on said lens barrel, said rack gear and said pinion gear being in constant mesh with each other.

12. In a photographic camera having an objective lens barrel and housing structure formed with a light entrance in front of the lens barrel, the improvements which comprise focus adjusting means movable between at least two positions including an initial position to set said lens barrel to corresponding focusing positions, a lens protecting covering movably supported in position by said housing structure for selectively closing and opening said light entrance; means operatively connected with said focus adjusting means for biasing said focus adjusting means to said initial position; and means operatively connected with said focus adjusting means for interlocking said focus adjusting means with said lens protecting covering, said interlocking means being capable of arresting said focus adjusting means at positions other than said initial position against said biasing means when said lens protecting covering is in position to open said light entrance, said interlocking means being actuated by said lens protecting covering to permit said focus adjusting means to return to said initial position from any other position by said biasing means when said lens protecting covering is moved to a position to close said light entrance.

* * * * *